United States Patent
Golovatai-Schmidt et al.

(10) Patent No.: US 7,243,680 B2
(45) Date of Patent: Jul. 17, 2007

(54) ELECTROMAGNETIC HYDRAULIC VALVE, IN PARTICULAR A 3/2-WAY DIRECTIONAL CONTROL VALVE, FOR CONTROLLING A VARIABLE DRIVE TRAIN OF AN INTERNAL COMBUSTION ENGINE

(75) Inventors: Eduard Golovatai-Schmidt, Röttenbach (DE); Michael Kraemer, Korb (DE)

(73) Assignee: Schaeffler KG, Herzogenaurach (DE)

( * ) Notice: Subject to any disclaimer, the term of this patent is extended or adjusted under 35 U.S.C. 154(b) by 0 days.

(21) Appl. No.: 11/454,966

(22) Filed: Jun. 16, 2006

(65) Prior Publication Data

US 2007/0062588 A1    Mar. 22, 2007

Related U.S. Application Data

(63) Continuation of application No. PCT/EP04/13189, filed on Nov. 20, 2004.

(51) Int. Cl.
*F15B 13/044* (2006.01)
*H01F 3/00* (2006.01)

(52) U.S. Cl. .......................... 137/596.17; 137/625.65; 335/281

(58) Field of Classification Search ........... 137/625.26, 137/625.65, 596.17; 251/129.14, 129.15; 335/274, 281
See application file for complete search history.

(56) References Cited

U.S. PATENT DOCUMENTS 1,333,626 A * 3/1920 Moard ...................... 335/278
3,851,285 A * 11/1974 Rothfuss et al. ............ 335/262
4,951,703 A   8/1990 Brehm et al.
4,998,559 A * 3/1991 McAuliffe, Jr. ........ 137/596.17

(Continued)

FOREIGN PATENT DOCUMENTS

DE           40 07 009 A1    9/1990

(Continued)

*Primary Examiner*—John Rivell
(74) *Attorney, Agent, or Firm*—Charles A. Muserlian

(57) ABSTRACT

The invention relates to a hydraulic valve (1), which comprises an electromagnet (2) with a magnet armature (3) as well as the valve part (4) with at least two valve seats (5, 6). The electromagnet (2) is formed by a hollow-cylindrical plastic coil former (8), a coil winding (10) which is accommodated in the latter and a magnet housing (11) which encloses the coil winding (10), the hollow cylinder of the coil former (8) being formed as an armature space (14) of the magnet armature (3), into which an upper magnet pole (15) and a lower magnet pole (16) protrude. The valve part (4) is formed by a hollow-cylindrical valve housing (18), which has a pressure connection (P) at the end as well as a consumer connection (A) and a tank connection (T), respectively arranged in its lateral surface (19), in the hollow cylinder of which housing two cup-shaped deep-drawn parts (23, 24) with the valve seats (5, 6) are pressed. The hydraulic valve (1) can be inserted into a complementary valve receptacle by the valve part (4) and has a fastening flange (26), by means of which it can be screwed on the valve receptacle in a manner sealing the pressure medium.

According to the invention, at least the magnet housing (11) and the lower magnet pole (16) of the electromagnet (2) and/or the valve housing (18) and the fastening flange (26) of the hydraulic valve (1) are respectively formed as one-part integral components and as individual parts which can be produced without machining.

11 Claims, 3 Drawing Sheets

U.S. PATENT DOCUMENTS

| | | | |
|---|---|---|---|
| 5,076,323 A * | 12/1991 | Schudt | 137/596.17 |
| 5,102,096 A | 4/1992 | Siegel et al. | |
| 5,135,027 A * | 8/1992 | Miki et al. | 137/596.17 |
| 5,323,809 A * | 6/1994 | Tischer et al. | 137/596.17 |
| 5,564,676 A * | 10/1996 | Goloff et al. | 251/129.15 |
| 6,273,122 B1 | 8/2001 | Schudt et al. | |
| 6,328,065 B1 * | 12/2001 | Schmid et al. | 137/596.17 |
| 6,397,891 B1 * | 6/2002 | Neuhaus et al. | 137/625.65 |
| 6,966,338 B2 * | 11/2005 | Flynn et al. | 137/625.65 |
| 7,137,411 B2 * | 11/2006 | Golovatai-Schmidt et al. | 137/625.65 |
| 2003/0037825 A1 * | 2/2003 | Runge et al. | 137/596.17 |
| 2003/0136449 A1 * | 7/2003 | Boddy | 137/596.17 |

FOREIGN PATENT DOCUMENTS

| | | |
|---|---|---|
| DE | 40 03 606 A1 | 12/1990 |
| DE | 198 10 330 A1 | 9/1999 |
| DE | 199 08 440 A1 | 8/2000 |
| DE | 100 03 205 A1 | 11/2000 |
| DE | 100 03 204 A1 | 12/2000 |
| DE | 199 51 665 A1 | 5/2001 |
| DE | 102 12 040 A1 | 7/2003 |
| WO | WO 99/02866 | 1/1999 |

* cited by examiner

ELECTROMAGNETIC HYDRAULIC VALVE, IN PARTICULAR A 3/2-WAY DIRECTIONAL CONTROL VALVE, FOR CONTROLLING A VARIABLE DRIVE TRAIN OF AN INTERNAL COMBUSTION ENGINE

This application is a continuation application of PCT/EP2004/013189 filed Nov. 20, 2004.

FIELD OF THE INVENTION

The invention relates to an electromagnetic hydraulic valve according to the features forming the precharacterizing clause of claim 1, and it can be realized particularly advantageously on a 3/2-way directional control valve for controlling a variable valve train of an internal combustion engine.

BACKGROUND OF THE INVENTION

DE 199 084 40 A1 discloses an electromagnetic hydraulic valve of the generic type which is formed as a 3/2-way directional control valve and substantially comprises an electromagnet with an axially movable magnet armature as well as a valve part with at least two valve seats and a closing ball corresponding to at least one valve seat. The electromagnet is in this case formed by a hollow-cylindrical plastic coil former with an electrical plug contact, at least one coil winding which is accommodated in the coil former and a magnet housing which encloses the coil winding, the hollow cylinder of the plastic coil former being formed at least partly as an armature space of the magnet armature, which is lined with a non-magnetic metal sleeve. By contrast, the magnet housing of the electromagnet is formed as a cylindrical tube sleeve, one end face of which is bent into the interior of the sleeve, forming an annular base, and the other end face of which has a number of flange lugs, by which the magnet housing is connected to the plastic coil former which can be inserted into it. A metal disk molded into the plastic coil former and a pole core inserted into the hollow cylinder of the coil former additionally form an upper magnet pole of the electromagnet, while its lower magnet pole is formed by a continuation of the valve part of the hydraulic valve that can be inserted into the hollow cylinder of the coil former and is connected to the latter in a magnetically permeable manner via the base of the magnet housing. This valve part substantially comprises a hollow-cylindrical valve housing, which has a pressure connection at the end as well as a consumer connection and a tank connection, respectively formed as a radial opening in the lateral surface of said housing. The two valve seats are in this case respectively formed as an axial aperture in the base of two cup-shaped deep-drawn parts, which are fastened in the hollow cylinder of the valve housing over their circumferential surfaces with a press fit and are connected to each other by a plastic sleeve. Guided in this plastic sleeve is the loosely arranged closing ball, which is in operative connection with the magnet armature of the electromagnet by means of a tappet, the magnet armature exerting a constant prestressing force on the closing ball in the currentless state of the electromagnet, closing the pressure connection of the hydraulic valve, by a compression spring arranged between it and the pole core of the upper magnet pole. This hydraulic valve, formed as a pulling type of magnetic valve, can be inserted by the valve part, which has a number of outer sealing rings, into a complementary valve receptacle and has a separate fastening flange, which is arranged between the electromagnet and the valve part and by means of which it can be screwed on the valve receptacle in a manner sealing the pressure medium.

However, a disadvantage of this known electromagnetic hydraulic valve is that it comprises a relatively large number of individual parts, and although some parts such as the magnet housing and the valve seats can be produced without machining, others, such as for example the valve housing of the valve part as well as the magnet armature and the pole core of the upper magnet pole of the electromagnet, are of a relatively solid form and, on account of their structural configuration, can only be produced by machining methods of production. However, as a result of the relatively long machine cycle times, the necessary tools and the material used, production by machining causes considerable production expenditure, which has ultimately proven to be uneconomical. In addition, a large number of individual parts also increases the complexity of the final assembly of the hydraulic valve, so that unfavorable production costs must be expected when this known hydraulic valve is produced.

OBJECT OF THE INVENTION

The invention is therefore based on the object of designing an electromagnetic hydraulic valve, in particular a 3/2-way directional control valve, for controlling a variable drive train of an internal combustion engine, which comprises a relatively low number of individual parts of a simple design and is distinguished by low expenditure in production and complexity in assembly as well as by low production costs.

SUMMARY OF THE INVENTION

In the case of an electromagnetic hydraulic valve as provided by the precharacterizing clause of claim 1, this object is achieved according to the invention by at least the magnet housing and the lower magnet pole of the electromagnet and/or the valve housing and the fastening flange of the hydraulic valve respectively being formed as one-part integral components and as individual parts which can be produced without machining.

In an advantageous embodiment of the electromagnetic hydraulic valve formed according to the invention, the valve housing of the valve part is formed as a cup-shaped sleeve which is produced by multi-stage deep-drawing from a sheet steel billet and has at its open end a material collar extending at right angles away from its lateral surface. The pressure connection of the hydraulic valve is then introduced by punching out the cup base of the sleeve, while the consumer connection and the tank connection of the hydraulic valve are incorporated by punching into the lateral surface of the valve housing radial apertures which are arranged axially offset in relation to one another. Depending on the application, in this case each of the two connections may either be formed just by one radial aperture or by two oppositely arranged radial apertures in the lateral surface of the valve housing, while at the same time the longitudinal axes of the connections may be arranged parallel to one another or offset by 90° in relation to one another.

In addition, in an expedient development of the hydraulic valve formed according to the invention, an annular shoulder is shaped from the peripheral material collar at the open end of the valve housing and the integrated fastening flange is shaped from said annular shoulder, the fastening flange preferably being formed as a web and having a smaller width than the diameter of the annular shoulder. This fastening flange in the form of a web has in an advantageous configuration a radius at its free end such that an aperture for a fastening screw can be arranged in the rotational center of this radius.

As a further advantageous embodiment of the hydraulic valve formed according to the invention, it is further proposed to produce the magnet housing of the electromagnet, which is formed as a cylindrical tube sleeve with a base bent into the interior of the sleeve, in the same way as the valve housing of the valve part by multi-stage deep-drawing from a sheet metal billet. The magnet housing is in this case initially formed after a first deep-drawing process as a cup with a closed base and, by further deep-drawing of a central part of the base axially into the interior of the sleeve and by final punching out of a circular axial aperture from this part of the base, is provided with the integrated lower magnet pole of the electromagnet.

In an expedient development of the hydraulic valve formed according to the invention, the inside diameter of the lower magnet pole, integrally formed in this way on the magnet housing or formed by the magnet housing itself, and the diameter of the axial aperture in the base thereof correspond in this case approximately to the outside diameter of the magnet armature, so that the latter can at least partly enter the axial aperture when the electromagnet is supplied with current. It has therefore also proven to be particularly advantageous to adapt the diameter of the magnet armature, proceeding from its end face on the valve side, at least with a certain degree of precision to the diameter of the circular axial aperture in order to obtain an optimum transition of the magnetic field lines from the magnet armature to the lower magnet pole by means of as small an air gap as possible between the magnet armature and the lower magnet pole.

The assembly of the valve housing on the magnet housing then takes place in a further embodiment of the hydraulic valve formed according to the invention by the annular shoulder of the valve housing and the annular part of the base of the magnet housing being placed against each other and centered in relation to each other and subsequently connected to each other by punctiform or annular induction or laser welding. Instead of laser connections, however, other connections involving a material bond are also conceivable, such as adhesive bonding or brazing. In addition, it is advantageous to insert the two deep-drawn parts with the valve seats of the hydraulic valve into the valve housing before the valve housing is connected to the magnet housing.

For complete assembly of the hydraulic valve formed according to the invention, the metal sleeve lining the armature space of the electromagnet is then initially inserted into the plastic coil former and then the magnet armature is inserted into the armature space of the electromagnet. Subsequently, an O-ring seal, which encloses the lower magnet pole and rests on the annular part of the base of the magnet housing, is placed in the magnet housing and a second closing body, described in more detail below, is introduced into the valve housing, so that subsequently the plastic coil former can be inserted into the magnet housing and connected to the magnet housing by the flange lugs on the latter.

A further feature of the hydraulic valve formed according to the invention is additionally that the upper magnet pole of the electromagnet is likewise formed as a collar sleeve which can be produced by punch drawing and is molded into the plastic coil former of the electromagnet. This collar sleeve bears with the inner surface of its sleeve part against the metal sleeve lining the armature space of the electromagnet and is connected to the valve housing in a magnetically permeable manner by means of its collar extending preferably at right angles away from the sleeve part. For the positional fixing of the upper magnet pole in the plastic coil former, the latter additionally has in its collar a number of cut-outs, in which corresponding plastic transitions form during the injection-molding of the plastic coil former. Particularly advantageous cut-outs have proven in this case to be four rectangularly shaped notches arranged uniformly around the circumference of the collar, although it is also possible to replace these by coaxial punched holes in the collar of the upper magnet pole.

By contrast, in a further embodiment of the electromagnetic hydraulic valve formed according to the invention, the magnet armature of the electromagnet is formed as a hollow cylindrical sleeve which is open on both sides and can likewise be produced without machining, by extrusion with subsequent punching out of the base. A low-carbon cold-heading wire which is normalized after extrusion has proven to be particularly suitable as a material for the magnet armature, since it is distinguished by good flow properties and at the same time is highly magnetically permeable. Forming the magnet armature as a hollow cylindrical sleeve has proven to be advantageous particularly with regard to its low weight, since the magnet armature consequently has only a very small level of hysteresis. At the same time, a complementarily formed centering pin of a second closing body which is in operative connection with the closing ball and one of the valve seats of the valve part can be inserted into the opening on the valve side of the hollow cylindrical sleeve in such a way that said second closing body can be displaced by the magnet armature in a manner which is free of play both in the axial and radial directions.

In an expedient development of the hydraulic valve formed according to the invention, the second closing body of the valve part is preferably formed as a plastic injection-molded part and substantially comprises a straight pin as a basic body which has a number of axial-guiding ribs integrally formed on its lateral surface in the radial direction. These axial-guiding ribs bear against the end face on the valve side of the magnet armature and serve for centering the second closing body within the valve housing. The spaces between the individual axial-guiding ribs simultaneously ensure internal pressure equalization between the space in the valve housing and the armature space of the electromagnet, since the pressure medium can consequently flow in an unrestricted manner along the closing body and also through separate transverse slots, which cross the centering pin of the closing body, and through the hollow space of the magnet armature and into and out of the armature space of the magnet armature. Three axial-guiding ribs which are arranged offset by 120° in relation to one another on the lateral surface of the basic body and the guide faces of which have a rounding corresponding to the inside diameter of the valve housing have therefore proven to be particularly expedient. It would however also be conceivable to arrange more than three such axial-guiding ribs on the lateral surface of the basic body. The end face on the valve side, opposite from the centering pin, of the second closing body is additionally formed as a closing cone which is in operative connection with the first valve seat of the hydraulic valve and continues axially in form of a tappet pin which is in operative connection with the loose closing ball for the second valve seat of the hydraulic valve. This closing ball is held in an axially movable manner in a plastic cage, which is integrally formed on a perforated disk which can be pressed into the aperture of the valve housing, and said closing ball is permanently pressed into the second valve seat when a pressure is applied by the pressure medium. This ensures that, in the currentless state of the electromagnet, the pressure connection of the hydraulic valve remains closed and the connection between the actuation connection and the tank connection of the hydraulic valve remains open.

When the electromagnet is supplied with current, as the connection between the pressure connection and the tank connection is closed, the connection between the pressure connection and the consumer connection is simultaneously opened by the second closing body pushing the closing ball out of the second valve seat, counter to the pressure of the hydraulic pressure medium, via the tappet pin at its end face on the valve side. The hydraulic consumer can consequently be supplied with the hydraulic pressure medium via the now opened second valve seat and the radial opening, which is situated above the latter, of the consumer connection in the valve housing.

When the current to the electromagnet is switched off, the loose closing ball is then pressed back into the second valve seat in the valve housing again by the pressure of the pressure, so that the pressure connection of the hydraulic valve is closed again and both the closing body and the magnet armature are displaced axially back into their starting position by the connection of the closing ball to the tappet pin of the second closing body.

The electromagnetic hydraulic valve formed according to the invention, in particular a 3/2-way directional control valve, for controlling a variable valve train of an internal combustion engine, consequently has the advantage over the hydraulic valves known from the prior art that, by integrating otherwise separately formed individual parts, it comprises a total number of individual parts that has been reduced to a minimum, said individual parts additionally being of simple design such that all the individual parts, without exception, can be produced by production processes without machining. As a result, not only is the production expenditure for the individual parts significantly reduced but so too is the complexity of the final assembly of the hydraulic valve, so that the hydraulic valve formed according to the invention is distinguished overall from the known hydraulic valves by particularly low production costs.

BRIEF DESCRIPTION OF THE DRAWINGS

The invention is explained in more detail below on the basis of an exemplary embodiment and is schematically represented in the associated drawings, in which.

DETAILED DESCRIPTION OF THE DRAWINGS

Figure 1:
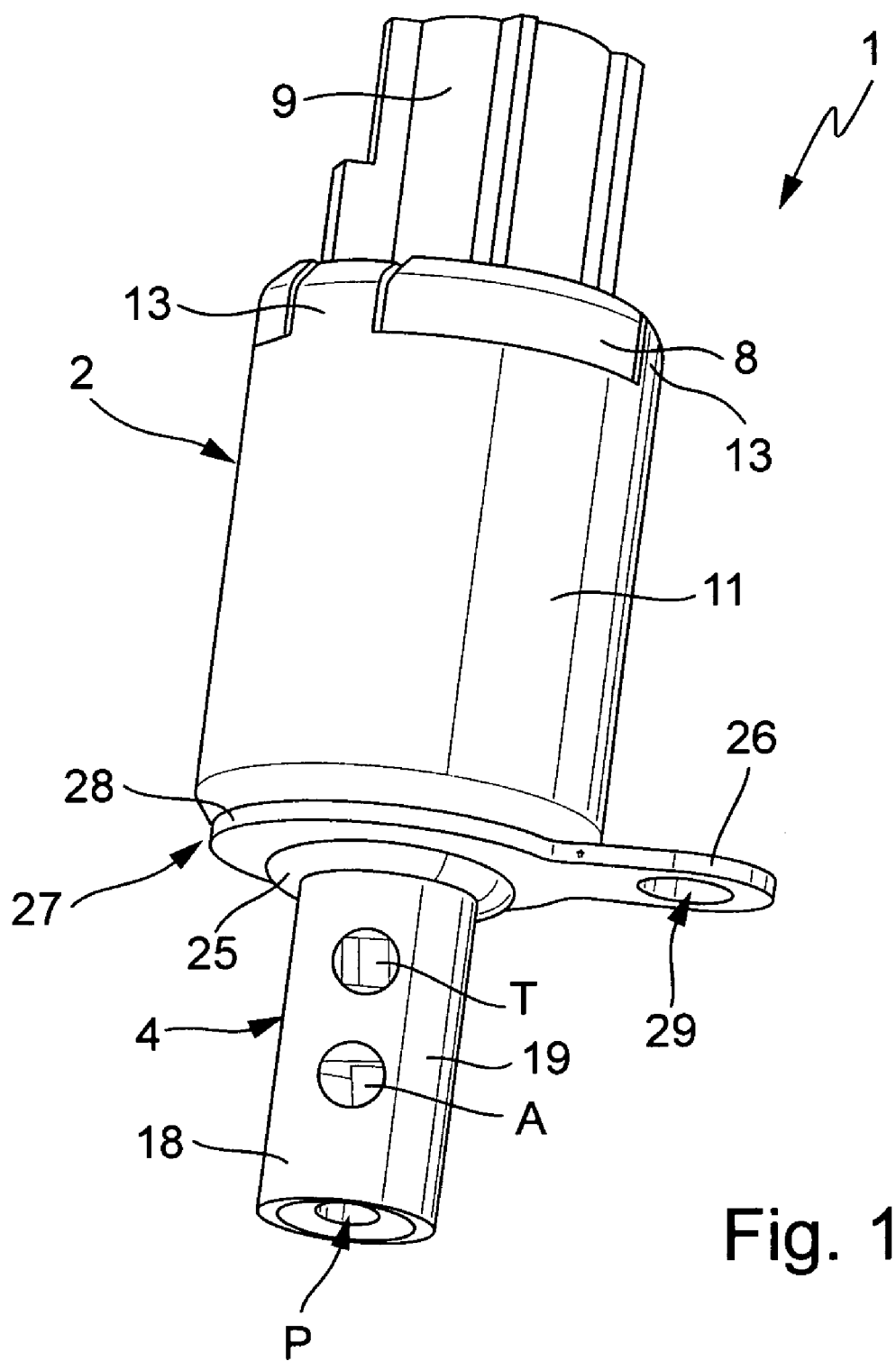
FIG. 1 shows a spatial overall view of the electromagnetic hydraulic valve formed according to the invention.
Figure 2:
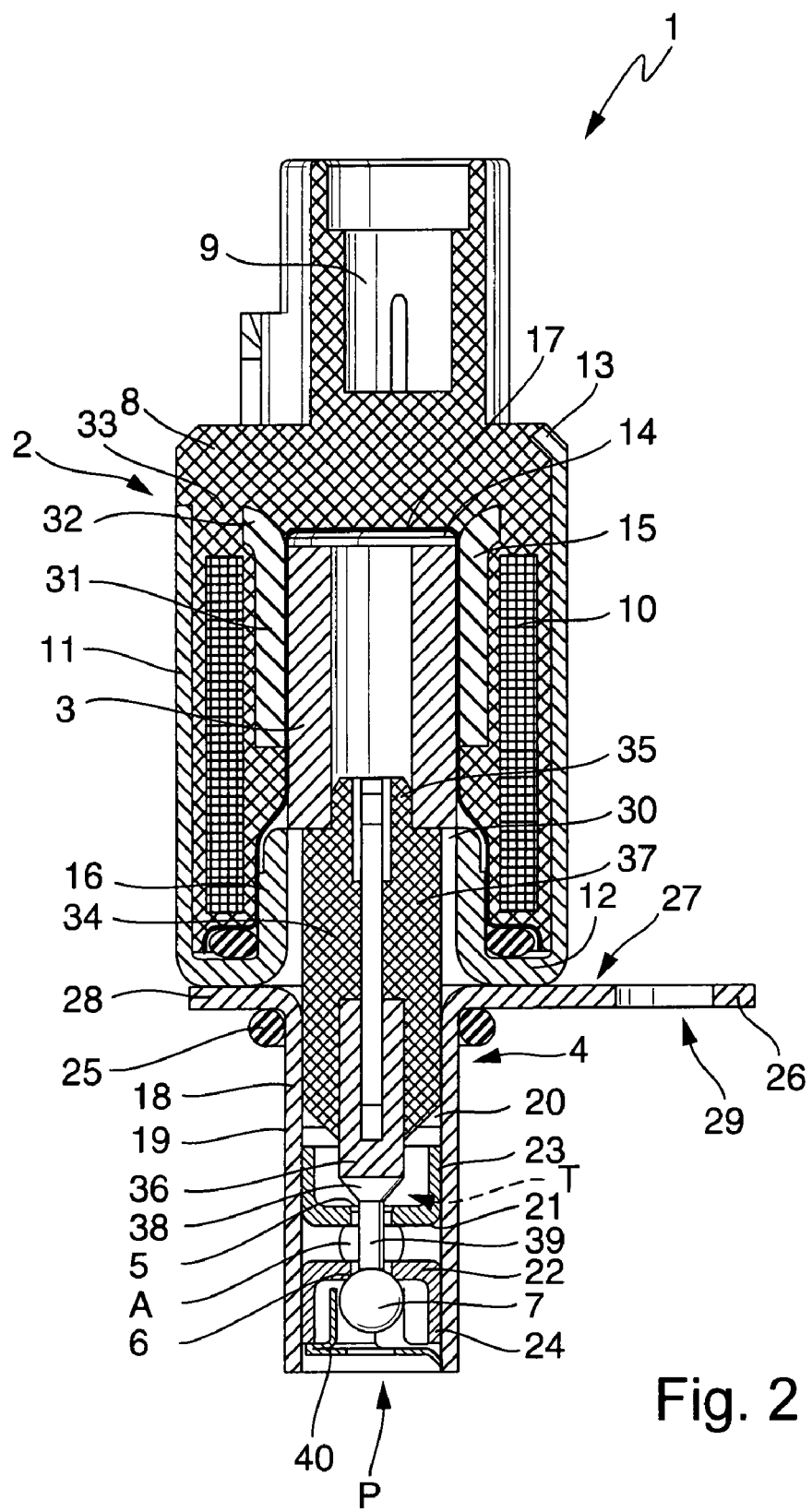
FIG. 2 shows a cross section through the electromagnetic hydraulic valve formed according to the invention.
Figure 3:
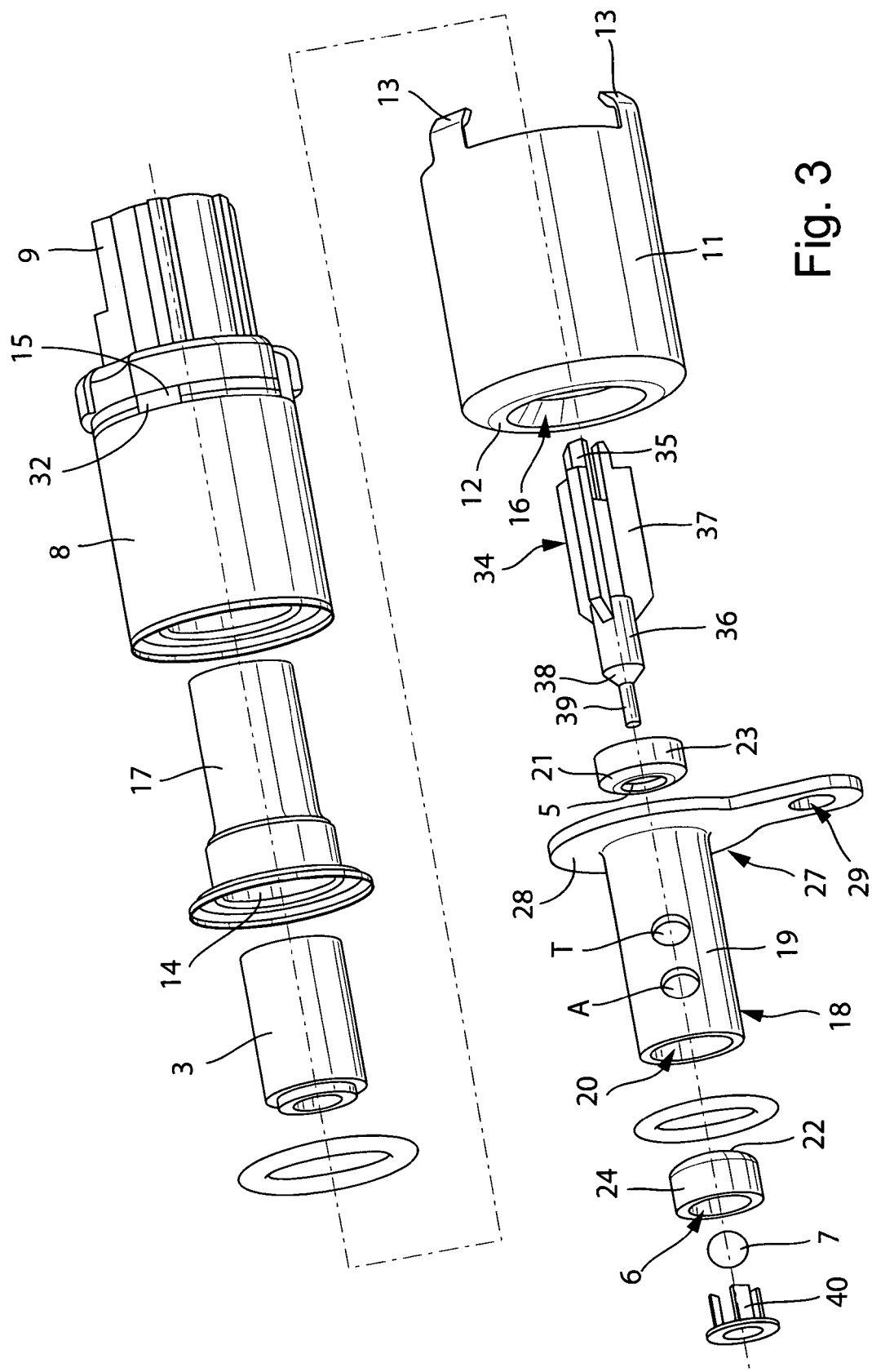
FIG. 3 shows an exploded view of the individual parts of the electromagnetic hydraulic valve formed according to the invention.

FIGS. 1 to 3 clearly reveal an electromagnetic hydraulic valve 1, which is formed as a 3/2-way directional control valve for controlling a variable valve train of an internal combustion engine and substantially comprises an electromagnet 2 with an axially movable magnet armature 3 as well as a valve part 4 with two valve seats 5, 6 and a closing ball 7 corresponding to the valve seat 6. The electromagnet 2 is in this case formed by a hollow-cylindrical plastic coil former 8 with an electrical plug contact 9, a coil winding 10 which is accommodated in the coil former 8 and a magnet housing 11 which encloses the coil winding 10, the magnet housing 11 being formed as a cylindrical tube sleeve, one end face of which is bent into the interior of the sleeve so as to form an annular base 12, and the other end face of which has a number of flange lugs 13 for connecting it to the coil former 8. The hollow cylinder of the plastic coil former 8 is also conventionally formed as an armature space 14 which accommodates the magnet armature 3 of the electromagnet 2 and into which an upper magnet pole 15 and a lower magnet pole 16 protrude, and which is lined with a non-magnetic metal sleeve 17.

As likewise evident from FIGS. 1 to 3, the valve part 4 of the hydraulic valve 1 is, by contrast, formed by a hollow-cylindrical valve housing 18 which has a pressure connection P at the end as well as the consumer connection A and a tank connection T, each formed as a radial opening in its lateral surface 19. In this case, FIG. 2 shows here that, within the hollow cylinder 20 of the valve housing 18, one of the valve seats 5, 6 of the valve part 4 is respectively arranged between the pressure connection P and the consumer connection A and between the consumer connection A and the tank connection T, the valve seats 5, 6 being respectively formed as axial apertures in the base 21, 22 of two cup-shaped deep-drawn parts 23, 24, which are fastened in the hollow cylinder 20 of the valve housing 18 over their circumferential surfaces with a press fit. The hydraulic valve 1 can then be inserted into a complementary valve receptacle (not represented) by the valve part 4 formed in this way and can also be screwed on the internal combustion engine by means of a fastening flange 26 which projects away laterally next to said valve receptacle, the valve part 4 additionally having an outer sealing ring 25 for sealing off the valve receptacle to prevent pressure medium leaks.

In addition, it can likewise be clearly seen in particular from FIGS. 2 and 3 that, to lower production expenditure and assembly complexity, and consequently to minimize production costs for the hydraulic valve 1, according to the invention the magnet housing 11 and the lower magnet pole 16 of the electromagnet 2 as well as the valve housing 18 and the fastening flange 26 of the hydraulic valve are respectively formed as one-part integral components and likewise as individual parts which can be produced without machining.

It can be seen from the exploded representation of the hydraulic valve 1 formed according to the invention in FIG. 3 that the valve housing 18 of the valve part 4 is formed as a cup-shaped sleeve, produced by multi-stage deep-drawing from a sheet metal billet and with a peripheral material collar 27 extending away at right angles at the open end, which sleeve is provided with the pressure connection P by punching out the cup base and with the consumer connection A and the tank connection T by punching double radial apertures in its lateral surface 19, arranged axially offset in relation to each other. From the peripheral material collar 27 of the valve housing 18, an annular shoulder 28 and the integrated fastening flange 26 of the hydraulic valve 1 are then integrally formed by final extrusion, the fastening flange 26 taking the form of a web and being formed with a smaller width than the diameter of the shoulder 28 and being formed with a screw aperture 29 at its free end provided with a radius.

It is also clear from the same representation in FIG. 3 and from FIG. 2 that the magnet housing 11 of the electromagnet 2, formed as a cylindrical tube sleeve with base 12 bent into the interior of the sleeve, can be produced in the same way as the valve housing 18 by multi-stage deep-drawing from a sheet metal billet. After a first deep-drawing process, the magnet housing 11 is in this case initially formed as a cup with a closed base 12 and is subsequently provided with the integrated lower magnet pole 16 of the electromagnet 2 by further deep-drawing of a central part of the base 12 axially into the interior of the sleeve and by final punching-out of a cylindrical axial aperture 30 from this part of the base 12. As can be clearly seen in FIG. 2, the inside diameter of the lower magnet pole 16 that is consequently integrally formed on the magnet housing 11 and the diameter of the axial aperture 30 in this case correspond approximately to the outside diameter of the magnet armature 3, so that the latter can at least partly enter the axial aperture 30 when the electromagnet 2 is supplied with current. In order thereby to achieve an optimum transition of the magnetic field lines from the magnet armature 3 to the lower magnet pole 16, the diameter of the magnet armature 3 at its end face on the valve side is adapted to the diameter of the axial aperture 30 by means of an integrally formed step, which can be clearly seen in FIG. 3.

To assemble the valve housing 18 on the magnet housing 11, the annular shoulder 28 of the valve housing 11 and the annular part of the face 12 of the magnet housing 11 are then placed one against the other and centered in relation to each other and are connected to each other by punctiform induction welding.

FIG. 2 likewise additionally reveals that the upper magnet pole 15 of the electromagnet 2 is likewise formed as a collar sleeve, which can be produced without machining, by punch drawing, is molded into the plastic coil former 8 of the electromagnet 2 and bears with the inner surface of its sleeve part 31 against the metal sleeve 17 of the electromagnet 2. At the circumference of its collar 32, the upper magnet pole 15 has in this case a number of cut-outs 33, which are provided as plastic transitions for the positional fixing of the upper magnet pole 15 in the plastic coil former 8, while the remaining collar 32 of the upper magnet pole 15, as indicated in FIG. 3, is connected in a magnetically permeable manner to the magnet housing 11.

It is finally also clear from the detailed representation in FIG. 3 that the magnet armature 3, which is formed as a hollow cylindrical sleeve which is open on both sides, of the electromagnet 2 can likewise be produced without machining, by extrusion. The base which is formed in this case is subsequently punched out in order to permit internal pressure equalization between the hollow cylinder 20 of the valve housing 18 and the armature space 14 of the electromagnet 2 by means of the consequently continuous hollow cylinder of the magnet armature 3. At the same time, the hollow cylinder opening on the valve side of the magnet armature 3 can be used for the purpose of inserting into the latter the sintering pin 35 of a second closing body 34, in operative connection with the closing ball 7 and the valve seat 5 of the valve part 4.

This second second closing body 34, which is formed as a plastic injection-molded part, is particularly clearly represented in FIGS. 2 and 3, from which it is evident that it substantially comprises a straight pin 36 which has three radial axial-guiding ribs 37 integrally formed on its lateral surface offset by 120° in relation to one another. These axial-guiding ribs 37 bear at the armature end against the end face of the magnet armature 3 and serve for centering the second closing body 34 within the valve housing 18. The end face on the valve side, opposite from the centering pin 35, of the second closing body 34 is additionally formed as a closing cone 38 which is in operative connection with the first valve seat 5 and continues axially in the form of a tappet pin 39 which is in operative connection with the loose closing ball 7 for the second valve seat 6. The loose closing ball 7 is in this case arranged in an axially movable manner within a plastic cage 40, which is integrally formed on a perforated disk which can be pressed into the aperture of the valve housing 18 and ensures that the closing ball 7 bears exactly in the valve seat 6.

| List of reference numerals | |
|---|---|
| 1 | Hydraulic valve |
| 2 | Electromagnet |
| 3 | Magnet armature |
| 4 | Valve part |
| 5 | Valve seat |
| 6 | Valve seat |
| 7 | Closing ball |
| 8 | Plastic coil former |
| 9 | Plug contact |
| 10 | Coil winding |
| 11 | Magnet housing |
| 12 | Base |
| 13 | Flange lugs |
| 14 | Armature space |
| 15 | Upper magnet pole |
| 16 | Lower magnet pole |
| 17 | Metal sleeve |
| 18 | Valve housing |
| 19 | Lateral surface |
| 20 | Base |
| 21 | Base |
| 23 | Deep-drawn part |
| 24 | Deep-drawn part |
| 25 | Sealing ring |
| 26 | Fastening flange |
| 27 | Material collar |
| 28 | Shoulder |
| 29 | Screw aperture |
| 30 | Axial aperture |
| 31 | Sleeve part of 15 |
| 32 | Collar of 15 |
| 33 | Cut-outs on 32 |
| 34 | Closing body |
| 35 | Centering pin |
| 36 | Straight pin |
| 37 | Axial-guiding ribs |
| 38 | Closing cone |
| 39 | Tappet pin |
| 40 | Cage |
| P | Pressure connection |
| A | Consumer connection |
| T | Tank connection |

The invention claimed is:

1. An electromagnetic hydraulic valve, comprising a 3/2-way directional control valve, for controlling a variable valve train of an internal combustion engine, comprising:

the hydraulic valve (1) substantially comprises an electromagnet (2) with an axially movable magnet armature (3) and a valve part (4) with at least a first valve seat (5) and a second valve seat (6) and a closing ball (7) corresponding to at least one of the valve seat (5, 6), the electromagnet (2) is formed by a hollow-cylindrical plastic coil former (8) with an electrical plug contact (9), at least one coil winding (10) being accomodated in the coil former (8) and a magnet housing (11) which encloses the coil winding (10), the magnet housing (11) is formed as a cylindrical tube sleeve, one end face of which is bent into the interior of the sleeve, forming an annular base (12), and the other end face of which has a number of flange lugs (13) for connecting it to the coil former (8), the hollow cylinder of the plastic coil former (8) is formed at least partly as an armature space (14) of the magnet armature (3), into which an upper magnet pole (15) and a lower magnet pole (16) protrude and which is lined with a non-magnetic metal sleeve (17), the valve part (4) is formed by a hollow cylindrical valve housing (18), which has a pressure connection (P) at the end and a consumer connection (A) and between the consumer connection (A) and a tank connection (T), respectively formed as a radial opening in its lateral surface (19), within the hollow cylinder (20) of the valve housing (18), one of the valve seats (5, 6) of the valve part (4) is respectively arranged between the pressure connection (P) and the consumer connection (A) and between the consumer connection (A) and the tank connection (T), the valve seats (5, 6) of the valve part (4) are respectively formed as axial apertures in a base (21, 22) of two cup-shaped deep-drawn parts (23, 24) which are fastened in the hollow cylinder (20) of the valve housing (18) over their circumferential surfaces with a press fit, the hydraulic valve (1) insertable into a complementary valve receptacle by the valve part (4), which has at least one outer sealing ring (25), and said hydraulic valve (1) has a fastening flange (26), by means of which it can be screwed on the valve receptacle in a manner sealing the pressure medium, wherein at least the magnet housing (11) and the lower magnet pole (16) of the electromagnet (2) and/or the valve housing (18) and the fastening flange (26) of the hydraulic valve (1) are respectively formed as one-part integral components and as individual parts produced without machining.

2. The hydraulic valve of claim 1, wherein
the valve housing (18) of the valve part (4) is formed as a cup-shaped sleeve which is produced by multi-stage deep-drawing from a sheet steel billet and has at the open end a material collar (27) extending away at right angles, which sleeve is provided with the pressure connection (P) by punching out a cup base and with the consumer connection (A) and the tank connection (T) by punching radial apertures in its lateral surface (19), arranged axially offset in relation to each other.

3. The hydraulic valve of claim 2, wherein
an annular shoulder (28) is shaped from the peripheral material collar (27) of the valve housing (18) by final punch-pressing and the integrated fastening flange (26) with a screw aperture (29) is shaped from said annular shoulder, the fastening flange being formed as a web.

4. The hydraulic valve of claim 1, wherein
the magnet housing (11) of the electromagnet (2), which is formed as a cylindrical tube sleeve with a base bent into the interior of the sleeve, produced by multi-stage deep-drawing from a sheet metal billet and is initially formed in the form of a cup with a closed base (12), which, by further deep-drawing of a central part of the base (12) axially into the interior of the sleeve and by final punching out of a circular axial aperture (30) from this part of the base (12), is provided with the integrated lower magnet pole (16).

5. The hydraulic valve of claim 4, wherein
the inside diameter of the lower magnet pole (16), integrally formed on the magnet housing (11), and the diameter of the axial aperture (30) in the base (12) thereof correspond approximately to the outside diameter of the magnet armature (30) when the electromagnet (2) is supplied with current.

6. The hydraulic valve of claim 3, wherein
the annular shoulder (28) of the valve housing (18) and the annular part of the base (12) of the magnet housing (11) bear against each other and are connected to each other by punctiform or annular induction or laser welding.

7. The hydraulic valve of claim 1, wherein
the upper magnet pole (15) of the electromagnet (2) is formed as a collar sleeve which can be produced without machining, by punch-drawing, and is molded into the plastic coil former (8), which sleeve bears with the inner surface of its sleeve part (31) against the metal sleeve (17) of the electromagnet (2) and is connected to the valve housing (11) in a magnetically permeable manner by means of its collar (32).

8. The hydraulic valve of claim 6, wherein
the upper magnet pole (15) has at the circumference of its coller (32) a number of cut-outs (33) as plastic transitions for the positional fixing of the upper magnet pole (15) in the plastic coil former (8).

9. The hydraulic valve of claim 1, wherein
the magnet armature (3) of the electromagnet (2) is formed as a hollow cylindrical sleeve which is open on both sides and produced without machining, by extrusion with subsequent pinching out of the base, and into the hollow cylinder of which there protrudes a centering pin (35) of a second closing body (34), which is in operative connection with a closing ball (7) and the first valve seat (5) of the valve part (4).

10. The hydraulic valve of claim 9, wherein
a second closing body (34) is formed as a plastic injection-molded part and substantially comprises a straight pin (36) with a number of radial axial-guiding ribs (37), and which has on its end face on the valve side a closing cone (38), which is in operative connection with the first valve seat (5), as well as a tappet pin (39), which is in operative connection with the closing ball (7).

11. The hydraulic valve of claim 4, wherein
an annular shoulder (28) of the valve housing (18) and the annular part of the base (12) of the magnet housing (11) bear against each other and are connected to each other by punctiform or annular induction or laser welding.

* * * * *